June 3, 1969 R. E. MACHOL, JR 3,448,436

ASSOCIATIVE MATCH CIRCUIT FOR RETRIEVING VARIABLE-LENGTH INFORMATION LISTINGS

Filed Nov. 25, 1966 Sheet 1 of 6

INVENTOR
R. E. MACHOL, JR.
BY Lucian C. Canepa
ATTORNEY

United States Patent Office 3,448,436
Patented June 3, 1969

3,448,436

ASSOCIATIVE MATCH CIRCUIT FOR RETRIEVING VARIABLE-LENGTH INFORMATION LISTINGS

Richard E. Machol, Jr., Long Branch, N.J., assignor to Bell Telephone Laboratories, Incorporated, Murray Hill, N.J., a corporation of New York Filed Nov. 25, 1966, Ser. No. 596,934
Int. Cl. G11b *13/00*
U.S. Cl. 340—172.5 5 Claims

ABSTRACT OF THE DISCLOSURE

A match circuit is disclosed for comparing variable amounts of externally-applied data with variable portions of data listings retrieved from a memory. The data listings may be composed of variable-length sublistings which are in turn composed of variable numbers of data character. Variable amounts of the externally-applied data may be compared with any portion or portions of the data listings. Upon the occurrence of a match, the data listing being examined is transferred to a utilization circuit.

This invention relates to information retrievel systems and more particularly to systems in which retrieval is accomplished by association or matching.

Methods of retrieving information from memory systems can be based either on the location of the information in memory or on the content of the information. The latter method has been denoted associative retrieval. With this method, externally-applied information or data, which will be referred to as keyed data, is compared with certain of the information or data stored in memory. When the keyed data and stored data match, the stored data and any data associated therewith is then retrieved.

The comparing or matching process may typically be accomplished either in the memory itself, in a separate hard-wired match circuit, or in the stored program control processing unit of the information retrieval system. The first scheme, that of performing the matching function in the memory itself, is appropriate when small but frequently accessed memories are used. For situations where large capacity memories are required, incorporating the matching function in the individual memory cells or units might prove rather costly. In such cases, isolating the matching function in one or a few common shared units offers a reasonable alternative. The common shared unit(s) could be either hard-wired match circuit(s) shared by several portions of the memory or the stored program central processing unit of the information retrieval system having access to the entire memory. Utilizing the match circuit configuration appears desirable where frequent and routine retrievals are required. This frees the system's central processing unit for other of its processing functions. Such a scheme is the type with which this invention is concerned.

The information to be stored and retrieved in information retrieval systems is frequently organized into blocks, subblocks, sub-subblocks, et cetera, of data. The most basic units of the data blocks are usually binary digits (bits) which are, in turn, grouped into different combinations to form characters (alphabetical, numerical, etc.). Further, it is common to dedicate certain portions of a data block for matching purposes. The keyed data is then compared only with that portion of the data block dedicated for matching purposes. If a match occurs, the entire data block is then retrieved. Dedicating certain portions of a data block for matching purposes may limit both the type and amount of keyed data which may be used.

Accordingly, an object of the present invention is to provide a match circuit for comparing stored data with variable amounts of keyed data.

Another object of the present invention is to provide a match circuit for comparing keyed data with various nonfixed portions of stored data blocks.

These and other objects of the present invention are realized in a specific illustrative embodiment which comprises a novel matching circuit in combination with a stored program central processing unit and a memory such as a drum or a disc file. Each data block in memory, which will hereafter be referred to as a listing, comprises subblocks called strings which in turn comprise characters alphabetical, numerical, etc. Each string of a listing contains a different type of information and for this reason must be distinguished from every other string in the listing. For example, in a telephone "listing," the last name, first name, address, etc. designations might each be considered different types of information. Distinguishing the strings of a listing is done by encoding the first character (called a flag connecter) at the beginning of each string to identify the type of information in that string.

From the central processing unit, the matching circuit receives the keyed data and some additional information which will hereafter be referred to as character counts. The character counts indicate in effect which characters of the keyed data are to be compared with the various data string characters of the listings to be examined. The central processing unit also indicates and controls the reading of data from whichever portion of the memory is to be examined (as determined by the central processing unit) and the application of that data to the matching circuit. Upon receiving the keyed data and the character counts, the matching circuit commences to compare the appropriate keyed data with portions of the stored data listings as the listings are applied to the circuit. When a match occurs, the listing is transferred to a utilization circuit. Those listings which do not match are discarded (such listings, however, are retained in the memory).

It is a feature of the present invention that a match circuit comprise a keyed data register for registering variable amounts of keyed data, a buffer register for registering data listings retrieved from memory, a character comparator for comparing the keyed data characters applied by the key data register with certain of the characters of each of the data listings applied by the buffer register, and a character counter and register for indicating to the character comparator which characters of each data listing are to be compared with the keyed data characters.

A complete understanding of the present invention and of the above and other objects, features, and advantages thereof may be gained from a consideration of the following detailed description of a specific illustrative embodiment thereof presented hereinbelow in connection with the accompanying drawing, in which.

Figure 2:
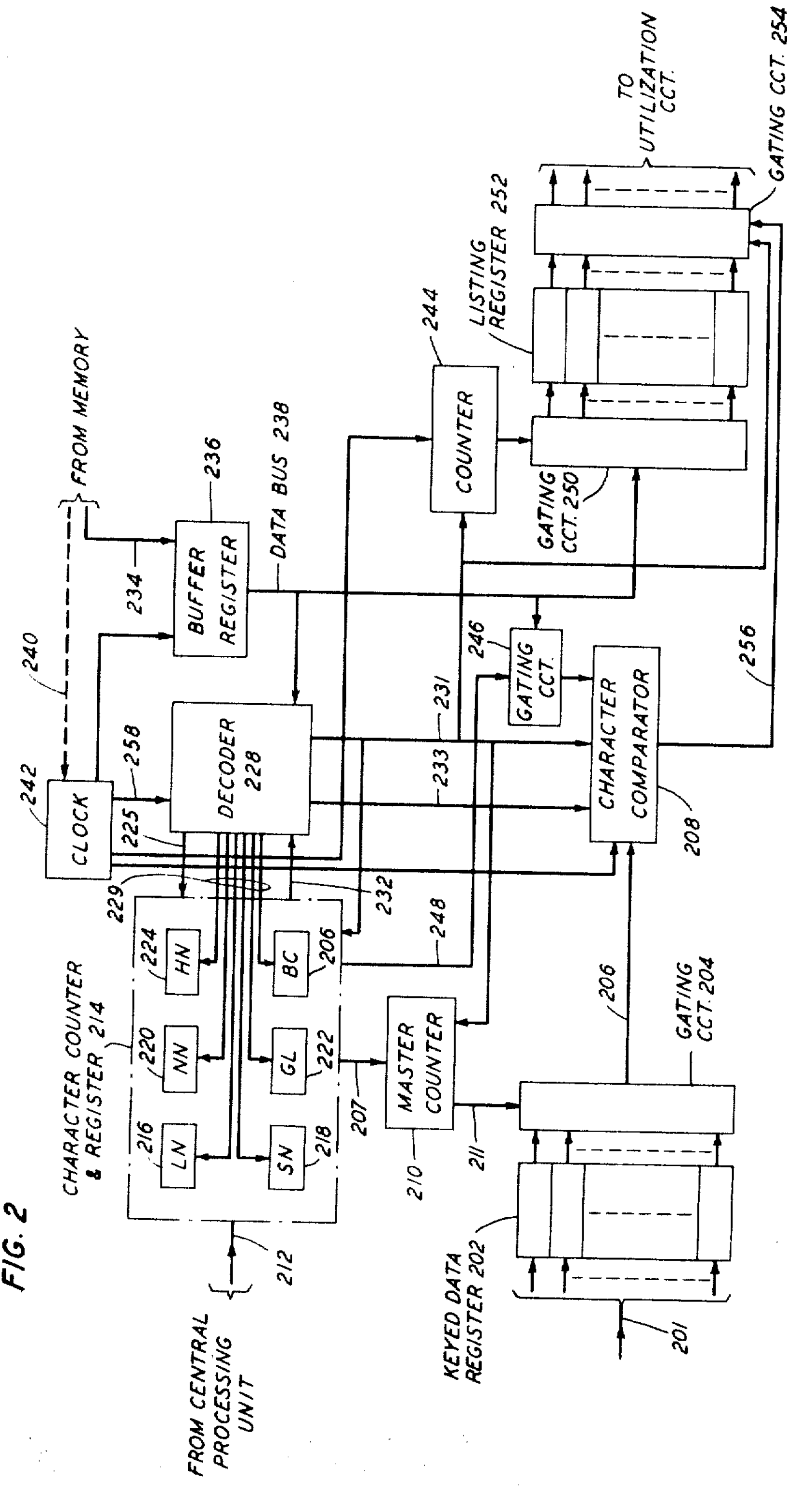
FIG. 2 shows a block diagram of a match circuit made in accordance with the principles of the present invention.
Figure 6:
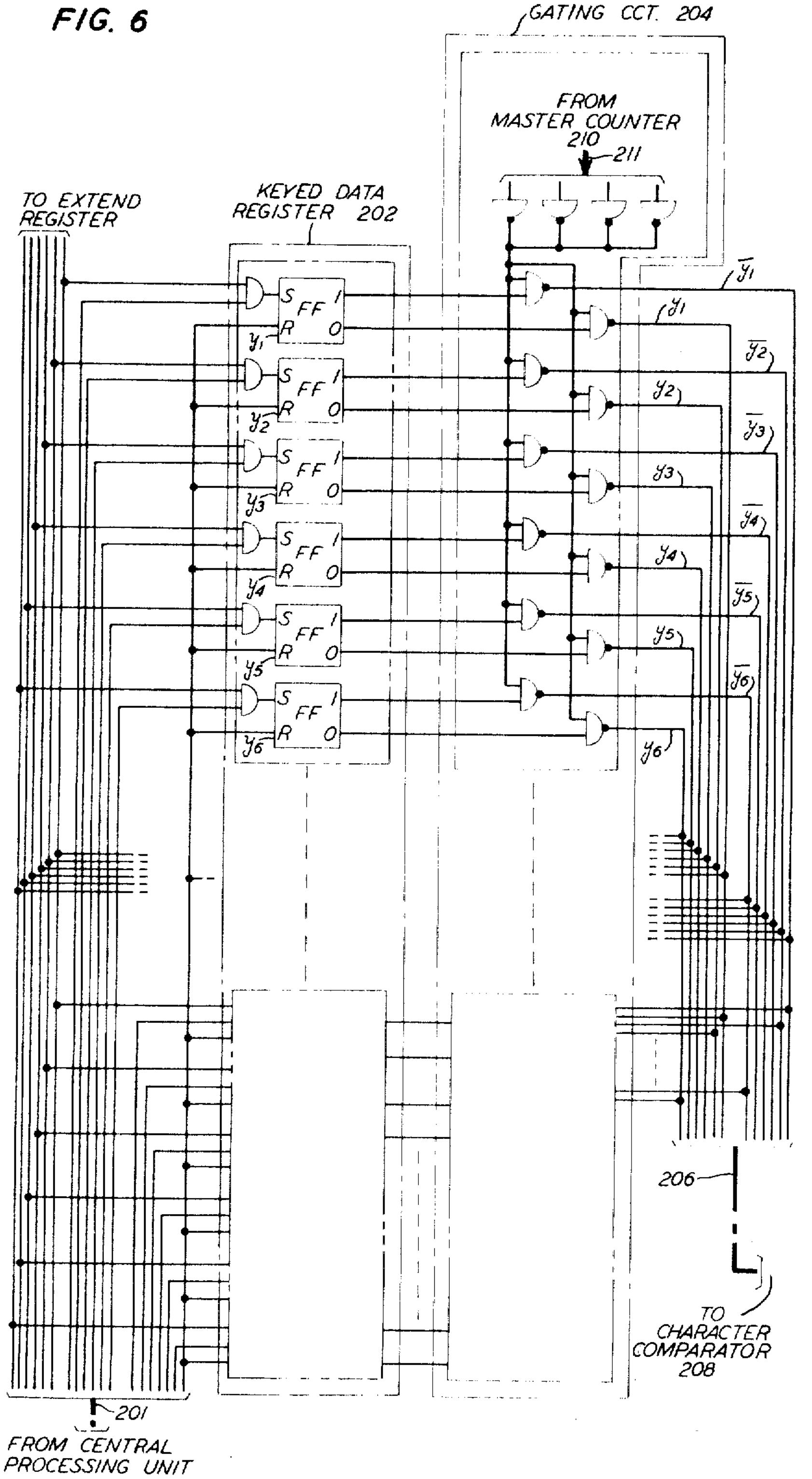
Figure 7:
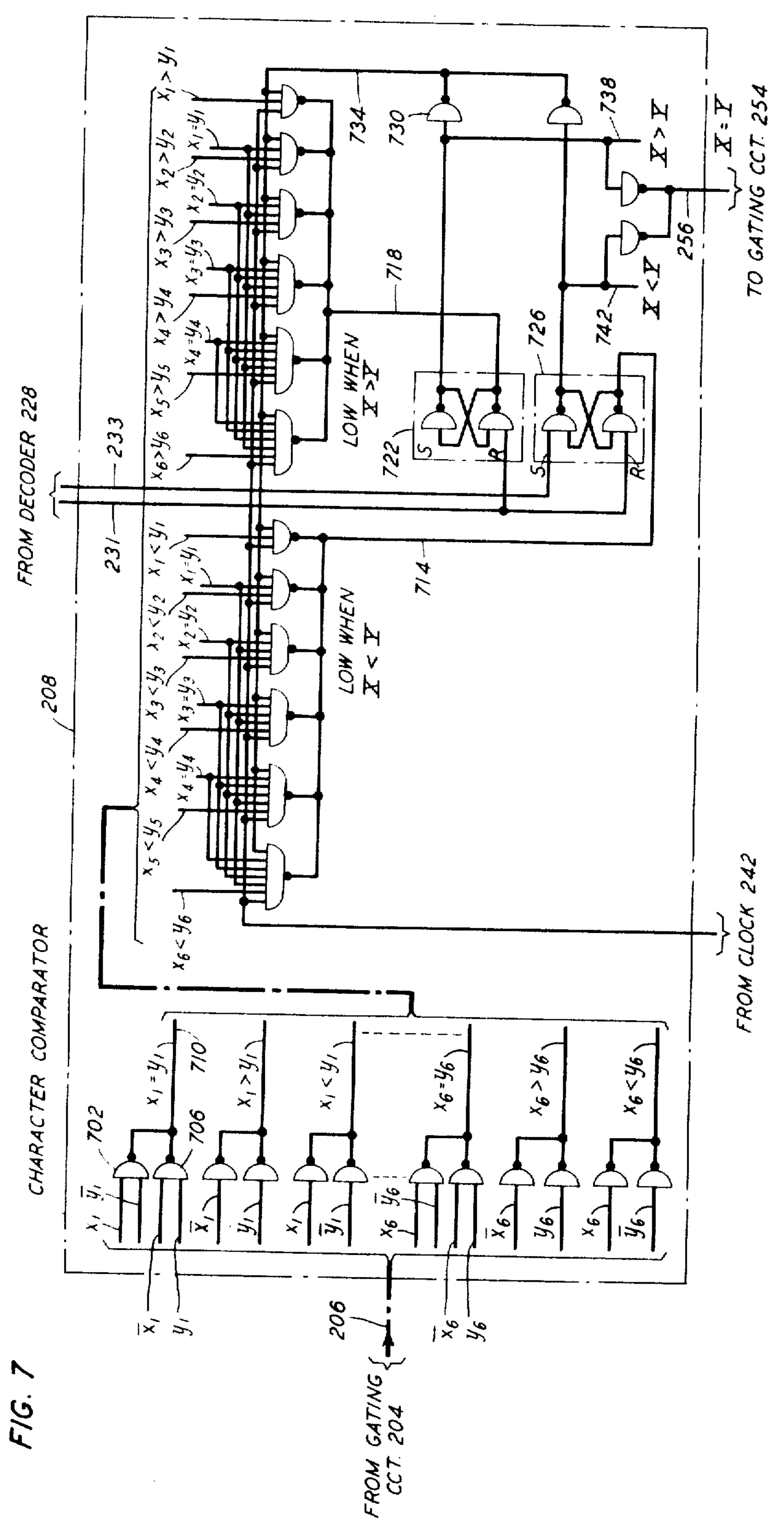

FIG. 6 shows illustrative logical circuitry for the keyed data register 202 and the gating circuit 204 of FIG. 2; and FIG. 7 shows illustrative logical circuitry for the character comparator 208 of FIG. 2.

Figure 1:
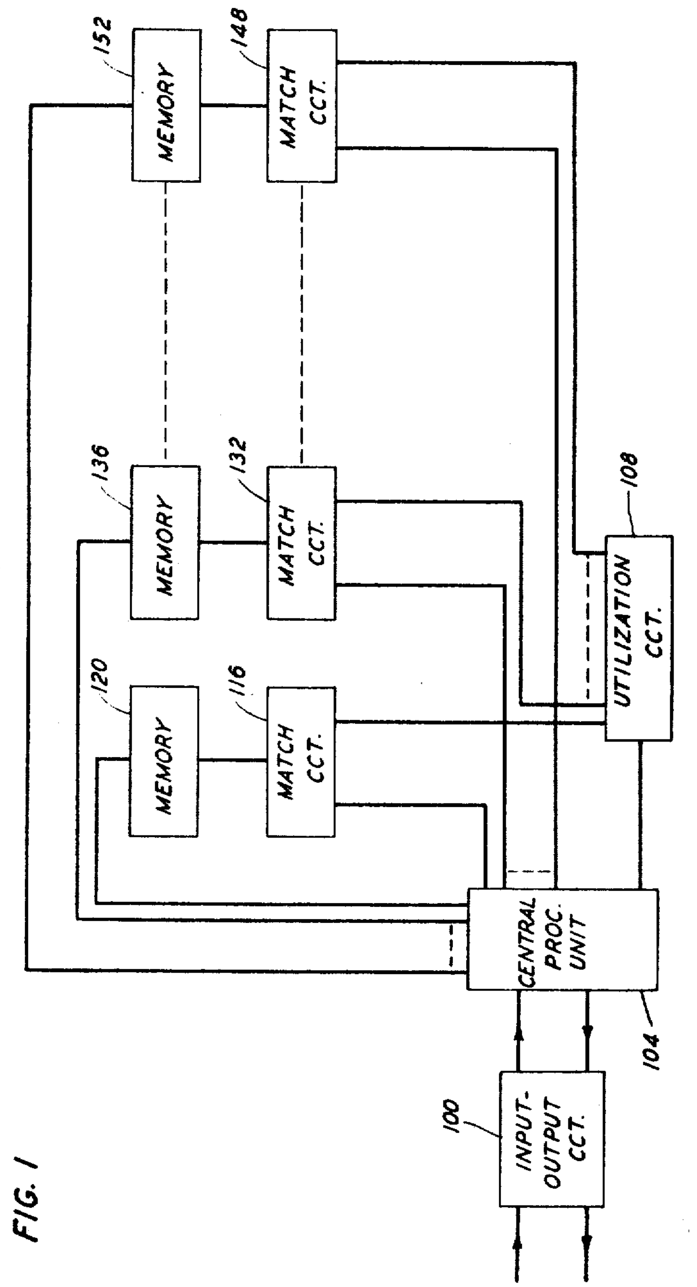
FIG. 1 shows an illustrative information retrieval system which utilizes match circuits made in accordance with the principles of the present invention.

The information retrieval system shown in FIG. 1 comprises novel match circuits 116, 132 . . ., and 148 and includes input-output circuitry 100 for receiving information retrival requests. The input-output circuitry 100 passes the request information to a central processing unit 104 which arranges the request information or keyed data in appropriate form to be applied to the match circuits 116, 132 . . ., and 148. The central processing unit 104 also determines from the keyed data which memory should be interrogated and, if the memory is a disc or drum file, which track(s) on the disc or drum to interrogate.

After applying the keyed data and certain character count information (information regarding which keyed data is to be compared with which stored data) to the appropriate match circuit and after initiating connections between the selected memory and the match circuit, the central processing unit 104 dissociates itself further from the matching process until signaled by the matching circuit.

Upon receiving the keyed data and character count information, the particular match circuit chosen (116, 132 . . . , or 148) commences to compare the keyed data with those portions of the stored data designated by the character counter information. All stored data listings whose compared portions match the keyed data are transferred to a utilization circuit 108.

Illustratively the information retrieval system shown in FIG. 1 could be a system for retrieving telephone directory listings stored on large capacity memories such as disc or drum files. A telephone information operator position having a keyboard similar to that disclosed in D. W. Hagelbarger-W. G. Hall-W. A. Malthaner Patent 3,242,470, issued Mar. 22, 1966, could be associated with the input-output circuitry 100 of FIG. 1. The utilization circuitry 108 could be a display device similar to that also disclosed in the above patent for displaying the telephone directory listings to the operator.

For the system described above, one method of organizing the telephone directory listings is to group the data into seven data strings as follows: (1) listing name (LN), (2) next name (NN), (3) house number (HN), (4) street name (SN), (5) geographical location (GL), (6) business class (BC) and (7) telephone number (TN). The beginning of each string in memory is identified by a special flag character, which characters will hereafter be referred to as the (LN) flag character, (NN) flag character, etc. An end of ilsting character (EL) identifies the end of each listing. As an example, the telephone listing,

MORRIS, J, 1435 BRINKMAN ST., 444–1234 would be written in memory as (LN)MORRIS(NN)J(HN)1435(SN)BRINKMAN
(TN)444–1234(EL)

The number of alphabetical or numerical characters in a string vary as do the number of strings in a listing. In the above listing, for example, only five of the possible seven strings were used. Another example of a listing in which all strings are utilized is as follows:

(LN)BLAKE(NN)CAL(HN)26(SN)YALE (GL)NEWARK(BC)ATTORNEY(TN)774–1131(EL)

In order to retrieve a listing, various characters from any or all of the strings may be used as the keyed data. Of course if too few characters are keyed, then the number of listings which match the keyed data would be very large. To narrow down the number of stored listings which match the keyed data, more keyed data characters should be used. With the J MORRIS listing given above, several possible keyed data sequences with the appropriate flag characters are:

(LN)MOR(NN)J(HN)1(SN)BR (LN)MORRIS(NN)J (LN)M(NN)J(HN)1435(SN)BRI

As can be seen, the person desiring to retrieve information has complete discretion as to what keyed data he uses. There is no guarantee, however, that what he does will be sufficient to isolate the desired listing from the other listings.

The match circuit shown in FIG. 2, illustratively arranged to utilize the above-described data listing organization, includes a keyed data register 202 and a character counter and register 214 for receiving and registering keyed data and character count information respectively from the central processing unit. Before the keyed data is applied to the keyed data register 202, it is arranged by the central processing unit in the same order as the information recorded in memory, that is, (LN) listing name first, followed by (NN) next name, (HN) house number, (SN) street name, (GL) geographical location, and (BC) business class, in that order. The character count information applied to the character counter and register 214 indicates the number of characters in each string of the keyed data. This is necessary since no flag characters are present in the keyed data. If the LN string of the keyed data contains three characters, then an LN counter-register 215 is set at three. Likewise, other individual counter-registers of the character counter and reigster 214 are set at the appropriate count.

After application of the keyed data and the character count information, the central processing unit initiates the reading from memory of the stored data listings. These listings are applied character-by-character over leads 234 to a buffer register 236. Clock pulses from a clock 242 cause the buffer register 236 to gate the characters onto a data bus 238 to a decoder 228 and gating circuits 246 and 250. The dashed lead 240 of FIG. 2 from the memory to the clock 242 indicates that the clock pulses are coordinated with the reading of characters from memory. A strobe or clock signal may in fact be generated within the memory (such as a drum or disc file) and applied directly to the buffer register 236 and other equipments shown. For illustrative purposes, however, the clock 242 with the lead 240 from memory is included.

The first character of the first listing received by the decoder, as discussed above, is the LN flag character. The decoder 228 upon decoding and recognizing this character prepares itself to pulse that lead of the leads 229 which is associated with the LN counter-register 216. (This lead will be referred to hereafter as the LN lead.) Thereafter, the LN lead is pulsed each time a character in the LN string is applied to the data bus 238 and received by the decoder 228 and until the next flag character (NN) is received and decoded. For example, if (LN)WALSH(NN)HANK were being read from memory, the decoder would apply a pulse to the LN lead for each alphabetical character of WALSH applied to the data bus 238 and received by the decoder 228. After receiving the NN flag character, the decoder 228 would apply a pulse to the NN lead upon receipt of each alphabetical character of the NN string HANK. If there are no data characters in a particular string of a listing, then of course, no pulses for that string would be applied to the corresponding counter-register of the character counter and register 214.

The character counter and register 214 has six counter registers as shown in FIG. 2, namely, the LN counter-register 216, the NN counter-register 220, the HN counter-register 224, etc. There is no counter-register for the telephone number (TN) string since it is assumed that this is the information which the information operator desires to retrieve. Thus no TN character would be among the keyed data so there is no need for a TN counter-register.

At the beginning of each matching process, as described earlier, the central processing unit registers a count in each counter-register corresponding to the number of characters in each string of the keyed data. Some of the counter-registers of course may not receive any count, indicating that no characters in that string are present among the keyed data. If in the WALSH example, all of the alphabetical characters of both the first and last name had been keyed by an information operator, but no other characters had been keyed, then the LN counter-register 216 would be set at five, the NN counter-register 220 at four, and all other counter-registers at zero. Each individual counter-register of the character counter and register 214 comprises a counting circuit and a registering circuit. These two circuits are distinguished in that the registering circuit once set by the central processing unit remains unchanged throughout any specific search. The counting circuit, on the other hand, is constantly changing. At the beginning of the matching process of any listing, each counting circuit has the same count as its corresponding registering circuit. As the first LN character (following the LN flag character) is applied to the data bus 238, the decoder 228 pulses the LN counter-register 216 causing the LN counting circuit to be decremented by one. This first decoder pulse also causes a master counter 210 to be incremented by one and causes the character counter and register 214 to generate a compare signal to be applied via lead 248 to the gating circuit 246 (to be discussed later). This process continues with each LN character applied to the data bus 238 until the LN counting circuit is decremented to a zero count. Thereafter, the master counter 210 is not incremented and no compare signal is applied to the gating circuit 246 even though LN characters are applied to the data bus 238. This is to prevent LN characters from the data bus being compared with other than LN characters of the keyed data (discussed later).

The process described above is repeated for each particular data string except, of course, that different counting circuits are decremented as the data characters corresponding to these circuits are applied to the data bus 238. After an entire listing has been applied to the data bus 238, the registering circuits reset their corresponding counting circuits to their initial state in preparation for the next listing. The resetting of the counting circuits is initiated by the decoder 228 upon the decoder's detection of the EL flag character. The master counter 210 is also reset to zero at this time.

If for a particular listing, the number of keyed data characters in a string is greater than the number of characters stored in memory for the corresponding string, then, of course, a mismatch indication is warranted. The decoder 228 detects such conditions and signals the character comparator 208 via lead 233. For example, if KU were the only characters in the LN string of a listing in memory and if KUC were the LN characters keyed into the keyed data register 202, then the decoder 228 would detect this condition and signal the character comparator 208 accordingly.

Each time the master counter 210 is incremented by the character counter and register 214, it applies an appropriate gating pulse to a gating circuit 204 which, in turn, gates the contents of a particular register of the keyed data register 202 to the character comparator 208 via lead 206. More particularly, with the first incrementation of the master counter 210, the contents of the first register of the keyed data register 202 are gated to the character comparator 208. The second incrementation results in the contents of the second register being gated, etc. Each time the master counter 210 is incremented, a compare signal is applied by the character counter and register 214 via lead 248 to the gating circuit 246 which then gates the particular data character currently on the data bus 238 to the character comparator 208.

In order to summarize the operation of the match circuit covering the features discussed thus far, assume that three LN characters and three NN characters have been registered in the keyed data register 202. The LN counter-register 216 and the NN counter-register 220 would thus each have a count of three, while the other counter-registers would have counts of zero. The first three LN characters following the LN flag character applied by the buffer register 236 to the data bus 238 would cause the decoder 228 to pulse the LN counter-register 216 decrementing the LN counting circuit to a count of zero. Each decrementation of the LN counting circuit would cause the master counter 210 to be incremented by one and a compare signal to be applied via lead 248 to the gating circuit 246. This, in turn, would cause an LN character to be gated both from the keyed data register 202 and the data bus 238 to the character comparator 208. After the LN counting circuit reached a zero count indicating that no more LN characters were registered in the keyed data register 202, subsequent LN characters read from memory and applied to the data bus 238 would have no effect on the master counter 210 nor the gating circuit 246 and thus would not be applied to the character comparator 208. (As will be pointed out later, this does not mean the characters are discarded.)

After all LN characters are read from memory and applied to the data bus 238 and after detecting the NN flag character, the decoder 228 commences to pulse the NN counter-register 220 upon receipt of each NN character from the buffer register 236. In the manner described above, each of the three NN characters registered in the keyed data register 202 is applied to the character comparator 208 simultaneously with the application of an NN character from the data bus 238. Thereafter, the characters read from memory (i.e., the remaining NN characters and the characters in the other strings) are simply applied to the data bus 238 without causing the incrementation of the master counter 210 or the generation of a compare signal over lead 248. With the reading out of succeeding listings, the process is repeated.

As shown in FIG. 2, all characters read from memory are applied to three different circuits via the data bus 238, these being the decoder 228, the gating circuit 246 and another gating circuit 250. If a particular character from memory is not to be compared with one of the characters in the keyed data register 202 then the gating circuit 246 does not allow the character from memory to be applied to the character comparator 208, as discussed earlier. *All* characters read from memory, however, are gated by the gating circuit 250 to a listing register 252 (both flag characters and data characters). This gating takes place in response to signals from a counter 244. The counter 244, in response to a clock pulse from the clock 242, directs the gating circuit 250 to apply the character currently on the data bus to a particular register in the listing register 252. The counter 244 is advanced with each pulse received from the clock 242. The particular count registered by the counter 244 governs to which register of the the listing register 252 the character on the data bus 238 is to be gated.

The listing register 252 and the circuitry associated therewith may be organized to operate in a number of ways, two of which will now be discussed. One organization requires that the listing register 252 be comprised of a sufficient number of registers to store the largest listing which can be read from memory. Then, after all characters of a listing are read into the listing register 252 and upon detection of the end of listing character (EL) by the decoder 228, the decoder signals the character comparator 208. The character comparator 208 in turn pulses a gating circuit 254 (providing no mismatches have occured) thus enabling the transfer of the listing register contents to a utilization circuit. If a mismatch has occurred, the contents of the listing register 252 would not be gated to the utilization circuit but rather would be erased. The decoder 228 upon detection of the end of listing character (EL) then pulses the counter 244 to reset it to zero in preparation for the next listing.

A second possible organization of the listing register 252 is to provide relatively few registers and require that the contents of some fraction of the registers (perhaps one-half) be transferred to the utilization circuit while the other registers are being filled. Upon detection of the end of listing character (EL), the decoder 228 signals the character comparator 208 which, if no mismatches have occurred, signals the gating circuit 254 to gate whatever the listing register 252 contains to the utilization circuit. The decoder 228 also sets the counter 244 to zero at this time. If a mismatch occurs, the character comparator 208 signals both the gating circuit 254 and the utilization circuit to discharge the complete listing in which the mismatch occurred. This organization would reduce the cost of the listing register 252 since only a minimum number of registers would be required—the number would be chosen to be compatible with the memory reading speed and the speed at which characters could be transferred to the utilization circuit. The utilization circuit, however, would require greater capability which might offset the cost saving in the listing register 252. Throughout the remainder of the specification, the first-described listing register organization will be employed.

Upon receipt of characters from the keyed data register 202 and from memory, the character comparator 208 commences the comparing process on a character-by-character basis. If no mismatches occur then the contents of the listing register 252, as already mentioned, are gated to the utilization circuit. Otherwise, the character comparator 208 inhibits the gating circuit 254 and the listing register contents are discarded. Even though a mismatch may occur at the beginning of the reading of a listing, the entire listing is read from memory and applied to the lising register 252 where it is there discarded.

Figure 3:
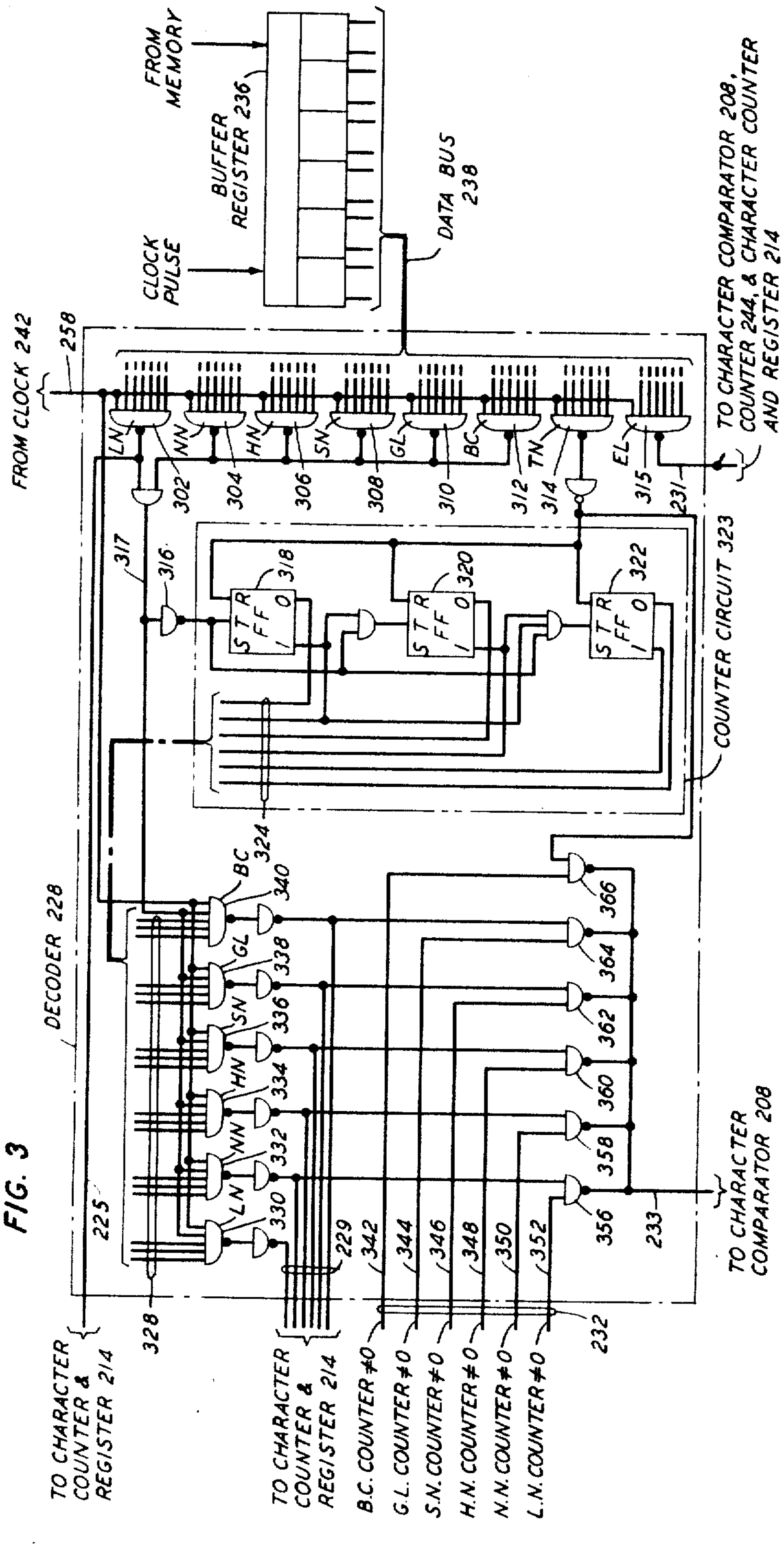
FIG. 3 shows illustrative logical circuitry for the decoder 228 of FIG. 2.

FIG. 3 shows an illustrative logical configuration for the decoder 228 of FIG. 2. Here it is assumed that the data characters are six bits in length and that every listing in memory contains every string identifying flag character even though there may be no data characters in some strings. The buffer register 236 contains six flip-flops for registering the six bits of each character. In response to successive clock pulses, the buffer register respectively applies characters to the data bus 238. When a particular flag character is applied to the data bus, one of the NAND gates 302, 304, 306, 308, 310, 312, 314 or 315 of the decoder 228 is activated. Each time one of these gates other than the gates 314 and 315 (which detect the TN and EL flag characters respectively) is activated, a counter circuit 323 comprised of flip-flops 318, 320 and 322 is advanced by one. Data listing characters other than the flag characters have no effect on the counter circuit 323. After being advanced, the counter circuit 323 retains its count until another flag character is detected at which time it is either advanced by one (if other than the TN or EL characters are detected) or it is reset (if the TN character is detected).

The counter circuit outputs 324, in combination with clock pulses on the lead 258 and the output conditions of NAND gates 302, 304, 306, 308, 310 and 312 on lead 317, enable the various NAND gates 330, 332, 334, 336, 338 and 340. That is, the appropriate one of the last-named NAND gates is enabled each time a data character other than a flag character is read from memory. A signal is thus transmitted over the appropriate one of leads 229 to the character counter and register 214 thereby indicating that a particular type data character is being read from memory. This signal, as mentioned earlier, is used to decrement that counting circuit associated with the data string whose data character is being read from memory. When a *flag* character is read from memory, lead 317 is low and thus none of the NAND gates to which lead 317 is connected is enabled and consequently no "character indicating" signal is transmitted to the character counter and register 214.

NAND gates 356, 358, 360, 362, 364 and 366 are utilized to detect the condition that more data characters of a particular string have been registered in the keyed data register than the corresponding string in memory contains. This necessarily means that the listing being compared does not match. Assume, as in a previous example, that the LN data characters KUC have been registered in the keyed data register and thus that the LN counter-register 216 registers a count of three. Assume also that a listing which contains only the LN characters KU is being read from memory. After the reading and comparing of characters K and U, the LN counting circuit will still have a count of one, even though no more LN characters are to be read. With the reading of the next *data* character (which would be an NN character) NAND gate 332 is enabled which in conjunction with lead 352 being high causes the enablement of NAND gate 356. The lead 352 is high because the LN counting circuit has other than a zero count. The enablement of gate 356 causes a signal to be applied via lead 233 to the character comparator 208 indicating that a mismatch has occurred. It is noted that the leads 342, 344, 346, 348, 350 and 352 of FIG. 3 are represented by the single lead 233 of FIG. 2.

Figures 4, 5:
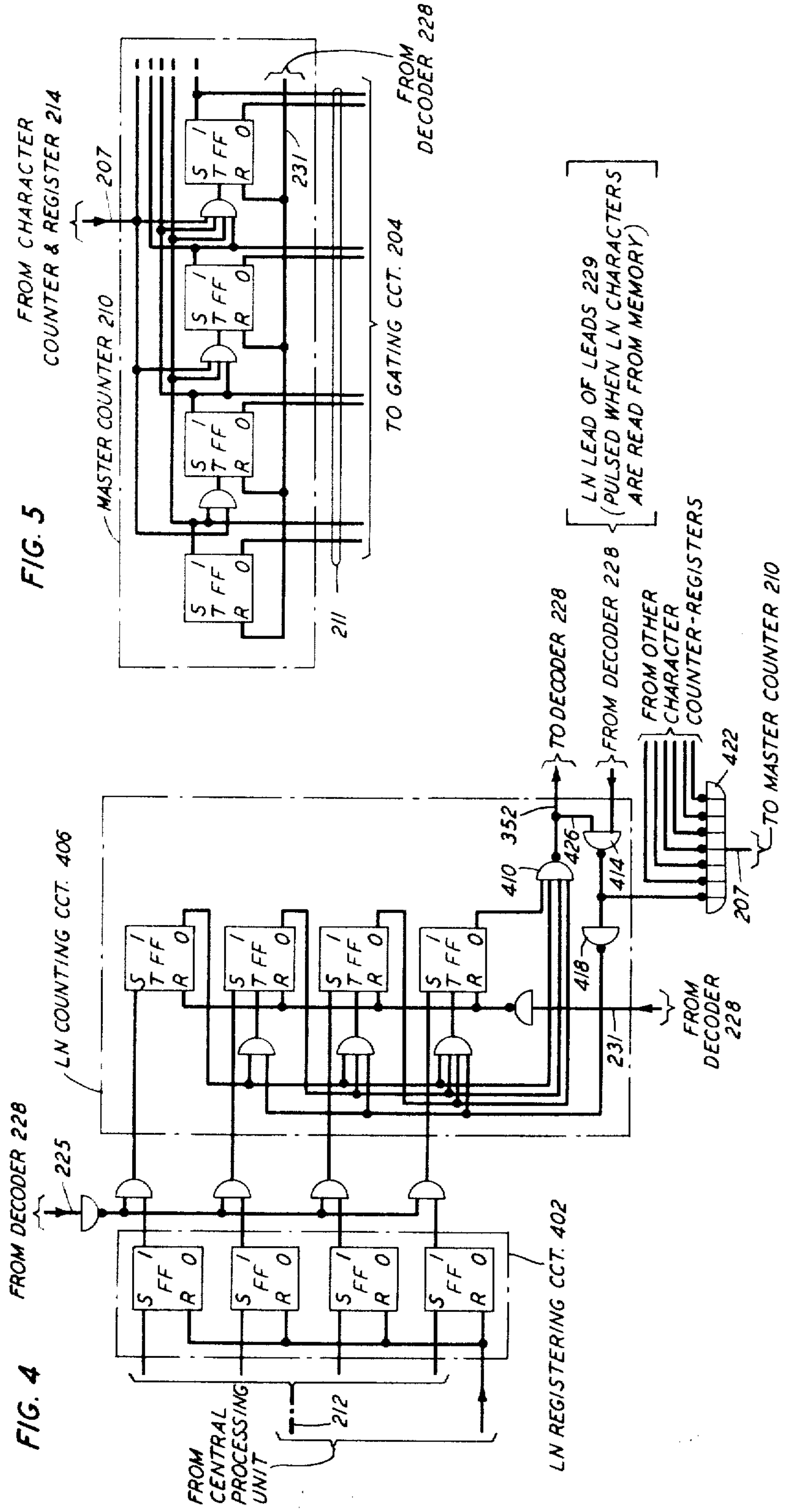
FIG. 4 shows illustrative logical circuitry for the LN character counter and register 216 of the character counter and register 214 of FIG. 2.
FIG. 5 shows illustrative logical circuitry for the master counter 210 of FIG. 2.

FIG. 4 shows illustrative detailed logical circuitry of the LN counter-register 216 shown in FIG. 2. Each of the individual counter-registers (NN, HN, etc.) of the character counter and register 214 is essentially the same. As mentioned earlier, prior to the start of each search, the central processing unit presets each counter-register over leads 212 to a count corresponding to the number of keyed data characters in the corresponding string. Assume for example that the keyed data contained three LN characters. In this case, the central processing unit sets the LN registering circuit 402 to a count of three. The output of the LN registering circuit 402 in conjunction with a low condition on lead 225 (resulting when the LN flag character is detected by the decoder) causes the setting of the LN counting circuit 406 also to a count of three. (The other character counting circuits are also set by the output of their corresponding character registering circuits *and* a low condition on lead 225.) Thereafter, as each LN character from memory is applied to the data bus 238 and detected by the decoder 228, the LN counting circuit 406 is decremented by one until a zero count is reached. With each decrementation, a pulse is applied to the master counter 210 via lead 207. Each pulse causes the master counter to be incremented by one. When a zero count in the LN counting circuit 406 is reached, a NAND gate 410 is enabled causing lead 426 to be made low. Thus each succeeding pulse over the LN lead of leads 229 (input to NAND gate 414) fails to enable NAND gate 414 and thus NOT-OR gate 422 is not enabled. Consequently, the master counter 210 is not incremented and no character from the keyed data register 202 is gated to the character comparator 208 as discussed previously. This, of course, is necessary to prevent a comparison of LN characters from memory with other than LN characters from the keyed data register 202 (the zero count of the LN counter 406 indicates that there are no more LN characters in the keyed data register). The operation is similar for the other counter-registers.

After the entire listing is read from memory, the decoder 228 detects the EL character and pulses the LN counting circuit 406 over lead 231 thereby resetting the counting circuit in preparation for the reading of the next listing. Upon detecting the LN flag character of the next listing, the decoder 228 pulses lead 225 setting the LN counter 406 again to a count of three, after which the above discussed procedure would be repeated. Lead 352, when in the high condition, indicates that the LN counter is not zero. The use of this information by the decoder 228 was discussed earlier.

An illustrative detailed configuration of the master counter 210 is shown in FIG. 5. Only four flip-flops are shown but of course more than this may be used if a count greater than sixteen is needed. The counter, which is initially set at zero, is incremented by one with each pulse received over lead 207 from the character counter and register 214. With each incrementation, appropriate combinations of pulses are applied to the output leads 211 of the counter. The combination of pulses are used to activate certain portions of the gating circuit 204. The master counter is reset to zero over lead 231 from the decoder 228 upon detection by the decoder of the end of listing (EL) character.

Illustrative detailed circuitry of the keyed data register 202 and the gating circuit 204 is shown in detail in FIG. 6. Each keyed data character transmitted from the central processing unit is registered in one of the six-bit (six flip-flop) registers. Only two of such six-bit registers are shown in FIG. 6, although it is understood that as many as desired may be used. After the keyed data characters are registered and upon receipt of appropriate pulses from the master counter 210, the characters are applied one at a time over leads 206 to the character comparator 208. The twelve output leads of the gating circuit 204, as shown in FIG. 6, are labeled so as to indicate what information about which character bits each lead conveys. For example, the labeling of the $\overline{y_1}$ lead as such indicates that that lead goes "high" whenever the $y_1$ bit position of the character currently being applied to the character comparator 208 contains a "0." Conversely the $y_1$ lead goes "high" when the $y_1$ bit position of a character contains a "1." This notation will also be used in FIG. 7.

An illustrative character comparator is shown in FIG. 7. This circuit compares on a character-by-character basis the keyed data characters with certain of the characters in each listing read from memory. The leads at the top of FIG. 7 labeled $x_1$, $\overline{x_1}$ . . . $x_6$, $\overline{x_6}$ are those over which the characters from memory are applied. The leads labeled $y_1$, $\overline{y_1}$ . . . $\overline{y_6}$, $y_6$ are those over which the keyed data characters are applied as discussed above. Upon the simultaneous application of a keyed data character and a character from memory, the function $x_1=y_1$, $x_1>y_1$, or $x_1<y_1$, is formed. For example, if the $x_1$ bit of the character from memory has the same value as the $y_1$ bit of the keyed data character, then lead 710 is made high. That is, neither the NAND gate 702 nor the NAND gate 706 is enabled. It should be mentioned in regard to the configuration of joining the outputs of two NAND gates that the joint output is high unless both NAND gates are enabled.

The outputs of the various joined NAND gates (702, 706, etc.) in conjunction with a "compare" pulse from the clock 242 are used to determine if the character from memory has a value less than ($X<Y$), greater than ($X>Y$), or equal to ($X=Y$) the keyed data character. The value of a character is determined by considering each character as if it were a binary number with the sixth bit ($x_6$ and $y_6$) being the most significant bit. Thus if the character from memory has a greater value than the keyed data character, lead 718 is made low causing flip-flop 722 to set. This in turn causes the enablement of gate 730 so that lead 734 is made low. The NAND gates to which lead 734 is connected are thus inhibited from being enabled by any of the remaining characters of the particular listing being read from memory. If the character from memory and the keyed data character matches, then neither flip-flop 722 nor 726 is set which results in leads 738 and 742 being maintained low. Lead 256 to the gating circuit 254 is thus maintained high which is interpreted by the gating circuit 254 as a match. Upon receipt of the EL character, the decoder 228 signals the character comparator 208 over lead 231 (the lead is made low) which resets flip-flop 722 in preparation for the next listing to be examined.

Although not discussed in detail here, it is evident that with appropriate utilization of the information appearing on leads 738 and 742, the match circuit could be used to find locations in memory at which to insert new listings. For example, the new listing to be inserted could be compared with each listing of an alphabetical group starting at the lower end of the group. Initially the memory characters would probably be of less value than the characters in the listing to be inserted, i.e., $X<Y$. Detection of a memory character of greater value than the corresponding character of the listing (lead 738 going high) would indicate the position where the new listing should be inserted. This position of course would be just before the listing containing the character having a value greater than the corresponding new listing character.

The configurations of the counter 244 and the gating circuit 250 are essentially the same as those of the master counter 210 and gating circuit 204, respectively. The function of the first-mentioned configuration, as discussed earlier, is to properly gate data characters from the data bus 238 to the listing register 252. This is done a character at a time.

Likewise the configurations of the listing register 252 and the gating circuit 254 are essentially the same as those of the keyed data register 202 and the gating circuit 204, respectively. The gating circuit 254 is arranged to gate the contents of the listing register 252 to the utilization circuit if no mismatches occur and upon receipt of a pulse from the decoder 228 indicating the EL character has been detected.

In summary, a match circuit has been described herein which provides for comparing variable amounts of externally-applied data with variable portions of data listings stored in a memory. The stored data listings which are of variable length might, illustratively, be comprised of variable-length sublistings which, in turn, might be comprised of data characters—alphabetical, numerical, etc. With such an organization, the externally-applied data may be so chosen that the portion of the data listings to be compared therewith may be taken from any or all of the sublistings. Upon the occurrence of a match, the stored data listing being examined is transferred to a utilization circuit. If a mismatch occurs, the listing is discarded.

It is to be understood that the above-described arrangements are only illustrative of the application of the principles of the invention. Numerous other arrangements may be devised by those skilled in the art without departing from the spirit and scope of the invention.

What is claimed is:

1. In combination, in an information retrieval system, means for receiving and registering data listings retrieved from a memory, said listings each comprising a variable number of sublistings, said sublistings, in turn, each comprising a variable number of data characters, a keyed data register for registering variable amounts of externally-applied data characters, comparison control means, means responsive to said comparison control means for comparing said externally-applied data characters or variable portions thereof stored in said keyed data register with any or particular data listing characters of any or particular sublistings received from said memory, and means connected to said receiving and registering means for transferring each of said data listings to a utilization circuit upon the occurrence of a match between said externally-applied data and the characters of such listings with which the comparison is made.

2. In combination, in an information retrieval system, first means for receiving and registering data listings retrieved from a memory, said listings each comprising a variable number of sublistings, said sublisting, in turn, each comprising a variable number of data characters, second means for receiving and registering externally-applied data, said data comprising a variable number of subgroupings which, in turn, comprise a variable number of characters, comparison control means, means connected to said first and second means and responsive to said comparison control means for comparing said externally applied data or variable portion thereof with variable portions of each of said data listings, said portions comprising characters from any or particular sublistings, and means connected to said first receiving and registering means for transferring each of said data listings to a utilization circuit upon the occurrence of a match between said externally-applied data and said portions of the retrieved data.

3. In combination in an information retrieval system, a match circuit comprising means for receiving and registering variable amounts of externally-applied data, a buffer register for receiving and registering data listings retrieved from memory, said listings each comprising a variable number of sublistings, said sublistings, in turn, each comprising a variable number of data characters, a character comparator connected to said receiving and registering means and said buffer register for comparing said externally-applied data with characters taken from a variable number of said data listing sublistings, character identifying means connected to said (a) buffer register, (b) receiving and registering means, and (c) character comparator for receiving external information regarding which of said data listing characters are to be compared with said externally-applied data and for signaling said character comparator when a comparison is to be made, and means connected to said buffer register and said character comparator for receiving and registering said data listings applied by said buffer register and for transferring each of said listings to a utilization circuit upon the occurrence of a match or discarding said listings upon the occurrence of a mismatch.

4. A combination as in claim 3 wherein said character identifying means comprises a decoder for determining to which of said sublistings each data listing character belongs and a character counter and register connected to said decoder for receiving said external information and responsive to said decoder character determination for signaling said receiving and registering means and said character comparator to compare certain of said data listing characters with said externally-applied data.

5. In combination in an information retrieval system, means for receiving and registering data listings retrieved from a memory, said listings each comprising a variable number of sublistings, said sublistings, in turn, each comprising a variable number of data characters, a keyed data register for registering variable amounts of externally applied data, said data comprising portions of a variable number of sublistings, a character comparator for comparing characters received from said receiving and registering means with characters received from said keyed data register, comparison control means for identifying the sublistings of each listing retrieved from memory and for selecting the characters from corresponding sublistings of the data registered in said keyed data register for application to said comparator for comparison, and means connected to said receiving and registering means for transferring each entire data listing to a utilization circuit upon the occurrence of a match between said externally applied data and those characters of the listing with which the comparison is made.

References Cited

UNITED STATES PATENTS

| | | | |
|---|---|---|---|
| 3,242,468 | 3/1966 | McDermid et al. | 340—172.5 |
| 3,243,783 | 3/1966 | Rabenda et al. | 340—172.5 |
| 3,257,646 | 6/1966 | Roth | 340—172.5 |
| 3,261,000 | 7/1966 | Behnke | 340—172.5 |
| 3,264,616 | 8/1966 | Lindquist | 340—172.5 |
| 3,290,659 | 12/1966 | Fuller et al. | 340—172.5 |
| 3,331,056 | 7/1967 | Lethin et al. | 340—172.5 |
| 3,332,069 | 7/1967 | Joseph et al. | 340—172.5 |
| 3,339,181 | 8/1967 | Singleton et al. | 340—172.5 |
| 3,351,915 | 11/1967 | Fought et al. | 340—172.5 |

ROBERT C. BAILEY, *Primary Examiner.*

JOHN P. VANDENBURG, *Assistant Examiner.*

U.S. Cl. X.R.

340—146.2